United States Patent
Carballo et al.

(10) Patent No.: US 7,636,556 B2
(45) Date of Patent: Dec. 22, 2009

(54) DIGITAL TRANSMISSION CIRCUIT AND METHOD PROVIDING SELECTABLE POWER CONSUMPTION VIA MULTIPLE WEIGHTED DRIVER SLICES

(75) Inventors: Juan-Antonio Carballo, San Jose, CA (US); Kevin John Nowka, Georgetown, TX (US); Ivan Vo, Austin, TX (US); Seung-moon Yoo, Santa Clara, CA (US)

(73) Assignee: International Business Machines Corporaion, Armonk, NY (US)

( * ) Notice: Subject to any disclaimer, the term of this patent is extended or adjusted under 35 U.S.C. 154(b) by 0 days.

(21) Appl. No.: 12/015,458

(22) Filed: Jan. 16, 2008

(65) Prior Publication Data

US 2008/0125062 A1  May 29, 2008

Related U.S. Application Data

(62) Division of application No. 11/050,019, filed on Feb. 3, 2005, now Pat. No. 7,353,007.

(51) Int. Cl.
*H04B 1/04* (2006.01)

(52) U.S. Cl. .................. 455/127.5; 455/69; 455/550.1; 375/295

(58) Field of Classification Search ............ 455/68, 455/69, 127.1, 127.2, 127.5, 550.1, 552.1; 375/295

See application file for complete search history.

(56) References Cited

U.S. PATENT DOCUMENTS

| | | | |
|---|---|---|---|
| 3,587,044 A | 7/1969 | Jenkins | |
| 4,092,596 A | 5/1978 | Dickinson et al. | |
| 4,803,638 A | 2/1989 | Nottingham et al. | |
| 4,819,196 A | 4/1989 | Lilley | |
| 5,016,269 A | 5/1991 | Rogers | |
| 5,126,686 A | 6/1992 | Tam | |
| 5,220,678 A | 6/1993 | Feei | |
| 5,422,760 A | 6/1995 | Abbott et al. | |
| 5,872,810 A | 2/1999 | Philips et al. | |
| 5,880,837 A | 3/1999 | Robert | |
| 5,912,920 A | 6/1999 | Marchok | |
| 6,134,214 A | 10/2000 | Takagi et al. | |
| 6,201,800 B1 * | 3/2001 | Tsubouchi et al. | 370/342 |

(Continued)

OTHER PUBLICATIONS

Dwivedi, et al., "Traffic Model for USA Long-distance Optical Network", Optical Fiber Communication Conference, 2000, vol. 1, pp. 156-158.

(Continued)

*Primary Examiner*—Nhan T Le
(74) *Attorney, Agent, or Firm*—Mitch Harris, Atty at Law, LLC; Andrew M. Harris; Libby Z. Handelsman

(57) ABSTRACT

A digital transmission circuit and method providing selectable power consumption via multiple weighted driver slices improves the flexibility of an interface while reducing power consumption when possible. A cascaded series of driver stages is provided by a set of parallel slices and a control logic that activates one or more of the slices, which combine to produce a cascaded active driver circuit. The power consumption/drive level selectability of the slice combination provides a driver that can be fine-tuned to particular applications to provide the required performance at a minimum power consumption level.

11 Claims, 2 Drawing Sheets

U.S. PATENT DOCUMENTS

| | | | |
|---|---|---|---|
| 6,215,816 B1 | 4/2001 | Gillespie et al. | |
| 6,282,045 B1 | 8/2001 | Glover | |
| 6,304,615 B1 | 10/2001 | Webster | |
| 6,363,241 B1 * | 3/2002 | Barakat et al. | 455/63.1 |
| 6,377,076 B1 | 4/2002 | Gauthier | |
| 6,389,069 B1 | 5/2002 | Mathe | |
| 6,580,930 B1 | 6/2003 | Fulghum et al. | |
| 6,810,216 B1 | 10/2004 | Tourunen | |
| 7,161,423 B2 * | 1/2007 | Paul et al. | 330/51 |
| 2002/0180480 A1 | 12/2002 | Dreps et al. | |
| 2003/0062926 A1 | 4/2003 | Wilcox et al. | |
| 2004/0051555 A1 | 3/2004 | Wilcox et al. | |
| 2004/0051565 A1 | 3/2004 | Dreps et al. | |
| 2004/0203477 A1 | 10/2004 | Carballo et al. | |
| 2004/0203483 A1 | 10/2004 | Carballo et al. | |
| 2004/0257114 A1 | 12/2004 | Hanneberg et al. | |
| 2005/0181751 A1 | 8/2005 | Fenk | |
| 2005/0240386 A1 | 10/2005 | Carballo et al. | |

OTHER PUBLICATIONS

Mehta, et al., "Fixed Sensor Networks for Civil Infrastructure Monitoring—An Initial Study", Dept. of ICS, UC Irvine, Aug. 2002.

* cited by examiner

DIGITAL TRANSMISSION CIRCUIT AND METHOD PROVIDING SELECTABLE POWER CONSUMPTION VIA MULTIPLE WEIGHTED DRIVER SLICES

The Present U.S. patent application is a Division of U.S. patent application Ser. No. 11/050,019, filed on Feb. 3, 3005 now U.S. Pat. No. 7,353,007.

CROSS-REFERENCE TO RELATED APPLICATIONS

The present application is also related to co-pending U.S. patent application Ser. No. 10/289,777, entitled "INTERFACE TRANSCEIVER POWER MANAGEMENT METHOD AND APPARATUS", filed on Nov. 7, 2002 and Ser. No. 10/829,829 entitled "METHOD AND SYSTEM FOR INTERACTIVE MODELING OF HIGH-LEVEL NETWORK PERFORMANCE WITH LOW-LEVEL LINK DESIGN", filed on Apr. 22, 2004, both of said applications having at least one common inventor with, and assigned to the same Assignee as, the present application. The specifications of the above-referenced patent applications are herein incorporated by reference.

BACKGROUND OF THE INVENTION

1. Technical Field

The present invention relates generally to communication link circuits, and more particularly, to digital signal transmitters having selectable drive capability and power consumption.

2. Description of the Related Art

Interfaces between present-day system devices and also between circuits have increased in operating frequency and complexity. In particular, high-speed serial interfaces include transmitters and receivers that typically consume relatively large amounts of the power budget of an integrated circuit. However, depending on channel conditions and parameters, the maximum output signal level of a transmission circuit may not be required for proper signal reception at the remote end of the interface. For example, the channel physical length may be shorter in some applications than in others, reducing signal degradation and thereby reducing transmit power requirements for the same receiver complexity.

Due to limited design resources and the need to satisfy the requirements of multiple interface applications, customers and channel conditions, transmitters and receivers within above-described interfaces are typically designed for the worst-case bit error rates and environmental conditions, leading to relatively complex receivers and high power transmitters. As a result, it is not always possible to provide a transmitter having lower power consumption when a high channel quality is available.

The above-incorporated patent application discloses an interface in which the transmitters and receivers have adjustable and/or adaptive parameters for finely tuning an interface to manage power consumption. One of the controllable parameters is the transmitter power level of the interface driver circuit(s). However, typical transmit power adjustment performed by changing the driver voltage and/or current levels is not always a preferable mechanism to adjust transmit power. Communications links within and between computer subsystems have reached bandwidths of between 5 gHz and 10 gHz and interface frequencies can be expected to increase in the future. Driver circuits operating at such high frequencies do not typically scale operation well over voltage or bias current adjustments, as internal impedances change with such adjustments causing mismatch and loss of power. Delay also typically increases with reduced transmitter power, compromising the integrity of the data window.

Transmitter drivers as described above are not generally simple digital buffers or inverters that switch power rail levels using an effectively near-zero impedance onto the interface line, but are typically linear driver circuits providing multiple stages of amplification or switches having progressively increasing and controlled signal current levels. The cascaded driver circuits progressively raise the power level of the signals internal to an integrated circuit or subsystem to the level required for transmission across the interface channel.

When providing an adjustable power consumption transmitter as used in the above-incorporated patent applications, several different power levels may be required to provide optimum selectability of power level vs. driver performance. In particular, with respect to the Application entitled "METHOD AND SYSTEM FOR INTERACTIVE MODELING OF HIGH-LEVEL NETWORK PERFORMANCE WITH LOW-LEVEL LINK DESIGN", a large number of unevenly-spaced driver power levels may be required.

It is therefore desirable to provide an interface transmitter circuit having selectable power consumption that provides multiple unequally-spaced power levels. It is further desirable to provide an interface transmitter circuit with a minimum of control logic.

SUMMARY OF THE INVENTION

The objective of providing an interface transceiver having multiple unequally-spaced selectable power levels with a minimum of control logic is provide in a method and apparatus.

The apparatus is a transmitter circuit for transmitting a digital signal. The transmitter is divided into slices, each having multiple cascaded driver stages extending from the transmitter input to the transmitter output. The slices are connected in parallel at each driver stage, and include an enable input so that any of the slices can be disabled, providing a programmable power level for the driver circuit. By using unequal power levels for each slice, the range of power selectability is improved over a set of equal power level slices, which can produce only an N:1 range of values where N is the number of slices. Control logic can also be reduced thereby, as the number of slices can be reduced while still meeting a desired range of power level/performance selectability.

The selection and power control process may be programmable by a logic connection, register bit or via a signal from an interface quality measurement circuit. A remote transmitter may also be power-managed at the other end of the interface by transmitting a control signal to the remote transmitter.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
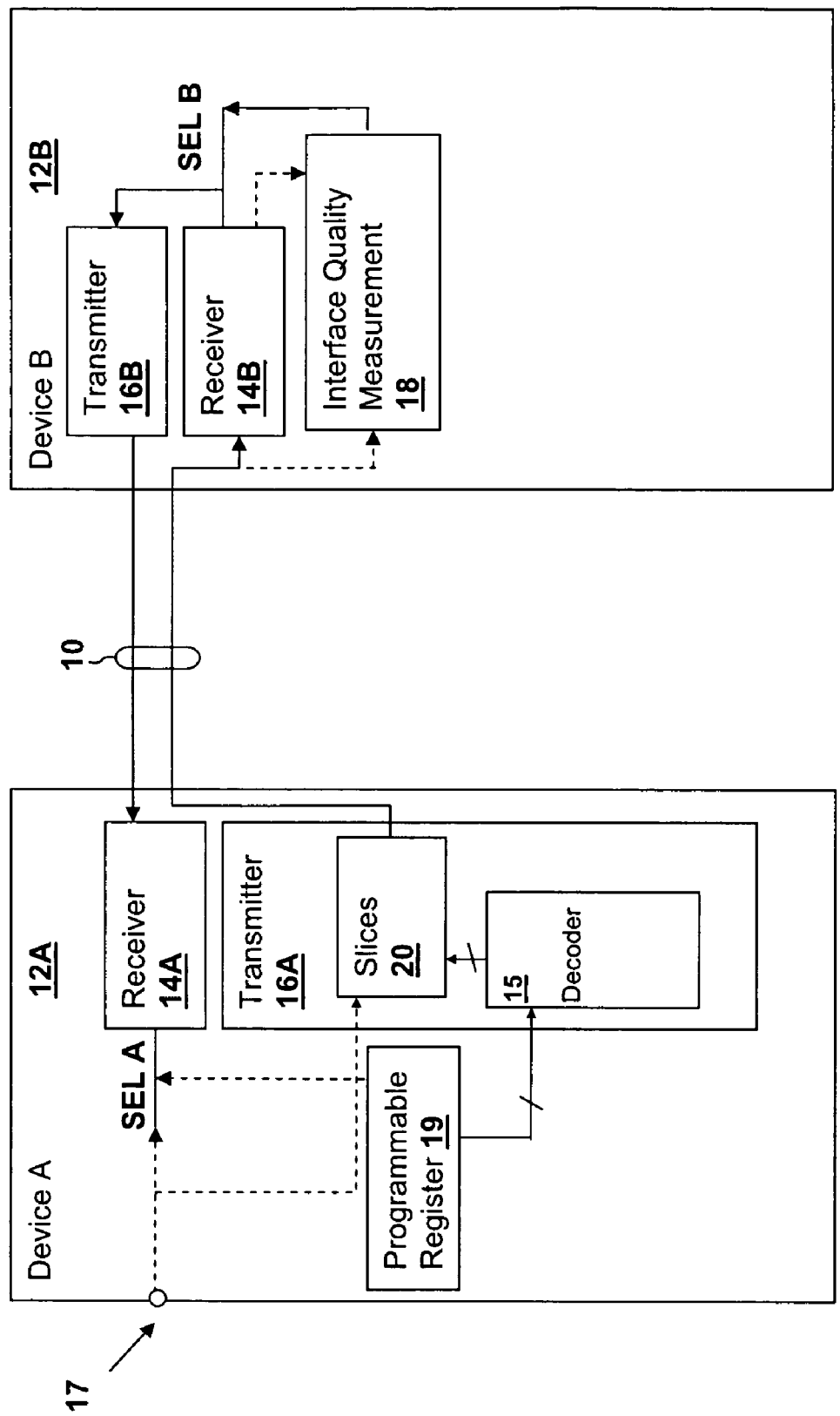
FIG. 1 is a block diagram of transceivers connected by an interface in accordance with an embodiment of the invention.

With reference now to the figures, and in particular with reference to FIG. 1, there is depicted a block diagram of transceivers 12A and 12B connected by an interface or channel 10 in accordance with an embodiment of the invention. Transceivers 12A, 12B may be located within a device such as a computer peripheral, a computer system, or within integrated circuits interconnected within a system. Interface 10 may be a single two wire bi-directional interface as depicted, or may be a full-duplex single wire interface or a bus having multiple transceivers in a half-duplex or full-duplex configuration. Transceivers 12A and 12B are connected to interface 10 each using a receiver 14A and 14B and a transmitter 16A and 16B, but the present invention is applicable to transmitters in general, and it should be understood that a transmitter in accordance with an embodiment of the invention may be incorporated in devices for connection to any of the above-specified types of interface 10, as well as other forms of electrical signal interconnection.

Transmitters 16A, 16B of the present invention incorporate power control mode selection inputs provided from programmable register 19 that reduce the power consumption of the transmitter when channel conditions permit. The transmitter (driver) circuit is divided into multiple slices 20 of unequal weights that are calculated to provide optimum coverage of various interface power consumption vs. performance.

Slices that are unneeded within transmitters 16A, 16B are disabled by isolating one or more power supply rails from internal inverters or buffers in each disabled slice. Alternatively the inverters or buffers can be designed with series pass transistors having gates coupled to an enable signal for blocking current through the inverters/buffers to prevent or substantially reduce leakage current flow through the device. Multi-threshold CMOS (MTCMOS) design can be used to further reduce leakage current flow in disabled slices, by using higher threshold voltage devices for the power supply rail isolation devices.

A decoder 15 receives the power level selection signals from programmable register 19 and produces control signals for each slice 20 that enable and disable the individual slices 20 independently. Thus, the above-described transmitter circuits provide a selectable power consumption that can be used to provide lower power usage and dissipation within transceivers 12A and 12B, when channel conditions are good, while maintaining low bit error rates (BERs) using a higher power consumption state when channel conditions are poor.

The selection of power consumption states via programmable register 19 may alternatively be hard-wired, externally programmed using an external data path to programmable register 19 or may be programmed via a reception from receiver 14A. Receiver 14A, transmitter 16A or both may be controlled by one or more selection signals, for example, multiple bits may be provided for each of transmitter 16A and receiver 14A so that power consumption may be very finely traded off for receiver processing power or transmitter signal strength, etc. Details of receivers having selectable power consumption are detailed in the above-incorporated patent applications and those receivers may be used in concert with the transmission circuits of the present invention.

Transceiver 12A is an example of a transceiver having external power mode selection via register programming or external connection. Wired or register selection of power modes is very useful in integrated circuits and systems, including computer systems, communication systems or peripherals. In such systems, external terminal(s) 17 can be hard-wired depending on the application (e.g., known short shielded cable length attached to a peripheral dictates a high channel quality or connection of two transceivers on a high-quality circuit board also dictates high channel quality).

Transceiver 12B is an example of a transceiver having automatic channel-quality-based power level selection in response to a measurement performed by interface quality measurement block 18, which may be an eye-diagram circuit, an error detection circuit or other mechanism for detecting that the channel quality is less than a desired threshold. Select signal SEL B is provided by an output of interface quality measurement block 18 and automatically selects a level of power in conformity with the measured channel quality.

Another type of transceiver power consumption control is provided by an interface link wherein a register such as programmable register 19 may be set via reception of a command code sent over interface 10 and received by a receiver such as receiver 14A. Remote interface link control is useful for informing a transceiver about channel conditions when the transceiver being programmed has no ability to determine the channel quality or does not have information regarding channel conditions (such as cable length). Also, return of channel quality from the remote side of an interface provides absolute information about the transmitted signals, where measurement at the local side provides only an estimate based on reception of signals from the remote side. Therefore, in practice, it would be desirable to provide interface quality measurements at both ends of the interface and return channel quality measurement information to the originating side for controlling transmitter power in accordance with the present invention.

Figure 2:
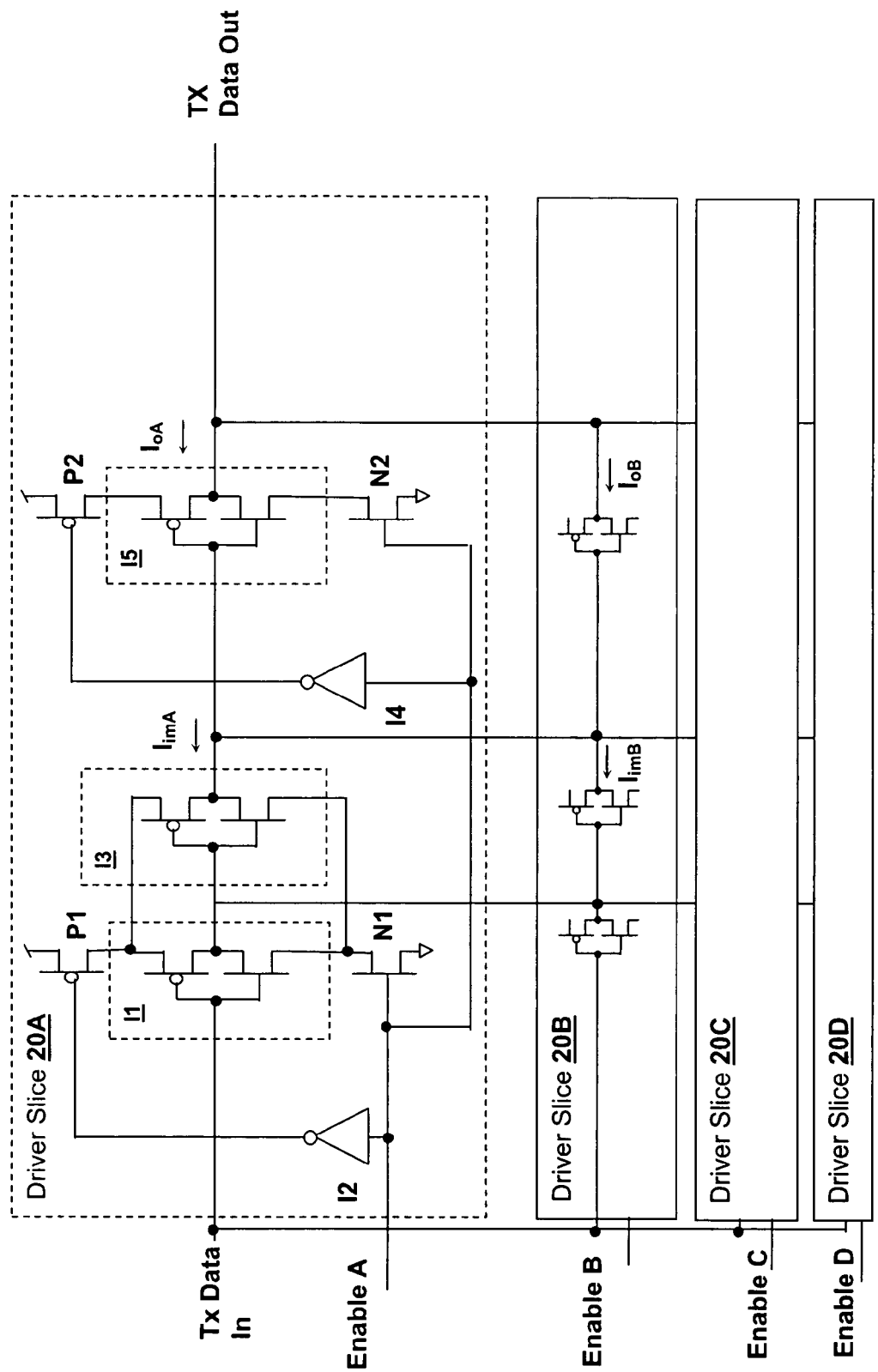
FIG. 2 is a schematic diagram of a transmission circuit in accordance with an embodiment of the invention.

Referring now to FIG. 2, details of a transmitter/driver in accordance with an embodiment of the invention are depicted. Driver slices 20A-20D provide parallel drive currents via the interconnection of slices 20A-20D at each internal output point. Details of driver slice 20A are show to illustrate various possibilities for internal implementation and should not be construed as limiting. An inverter I1 is selectively enabled by power supply control transistors P1 and N1 which are controlled by an Enable A signal and a complement generated by an inverter I2. The output of inverter I1 is connected to the outputs of the first stage of other driver slices 20B-20D which are generally co-located along the physical signal path of the distributed driver provided by the cascaded inverters (or buffers) within driver slices 20B-20D. The current level at each stage is determined by the sum of currents of each enabled driver slice. For example if slices 20A-20B are enabled and slices 20C-20D are disabled, current $I_{imA}$ which is the current contribution of a second inverter I3 stage of slice 20A, is added to $I_{imB}$, which is the current contribution of the corresponding stage of slice 20B. Similarly, the output current of the entire transmitter circuit in this power selection configuration will be $I_{oA}+I_{oB}$. Each driver slice 20A-20D has a current level for each stage that is a different fraction of the total possible current for each stage than for other slices. In general, the current level for each stage will be scaled as the same fraction for each slice, but that is not a limitation of the invention.

Also shown in details of driver slice 20A are different mechanisms for handling the enable control signal within slices 20A-20D. For inverters/buffers (such as inverters I1 and I3) in close proximity, it is more practical to share the power supply control devices P1 and N1, and thus reduce the overall number of devices required. When the power supply common internal rails ("virtual power supply rails") would extend over an impractical distance with respect to the desired sizes of power supply control devices P1 and N1, the enable signal is provided to another set of power supply control devices N2 and P2. Inverter I4 supplies a complementary enable signal, but alternatively, the output of inverter I2 may be connected to subsequent stages for controlling the positive power supply rail. In general, any combination of shared virtual power supply rails or bussed enable signals may be used, depending on the physical layout of the driver and the physical length between stages.

By selecting the current scaling for each slice as a particular discrete fraction of the total current for the overall transmitter/driver circuit, a variety of disparate interface requirement goals vs. power consumption goals can be met. If the slices are set to equal current levels, the selection range is N:1 in steps of unit current. If a "binary" division is chosen where each stage has a current level scaling factor of $2^n/2^{N-1}$ where N is the total number of slices and n is the particular stage, then a reduction in the number of devices and the size of the control architecture is achieved. However, there are a multitude of other non-equal current scaling that can be used to produce results optimized for particular applications and in accordance with other selectable interface features such as receiver processing power. The values can be arrived at experimentally or derived according to methods such as those described in the above-referenced patent application entitled: "METHOD AND SYSTEM FOR INTERACTIVE MODELING OF HIGH-LEVEL NETWORK PERFORMANCE WITH LOW-LEVEL LINK DESIGN."

The methodology described in the above-referenced patent application determines a transmitter signal strength for particular interface configurations based on required bit error rates (BERs) and jitter constraints. The determination is made in conjunction with other parameters such as receiver complexity, etc. so that the interface performance is assured under the selected conditions. By providing an arbitrary set of transmitter power levels based on the scaling factor of each driver slice 20, the ability to select driver power in conjunction with the other interface parameters and channel conditions provides a robust solution to interfaces that must serve a wide variety of applications.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of controlling power consumption in a digital interface transmitter, comprising:
   receiving an indication of that power consumption of said digital interface transmitter may be reduced; and
   disabling one or more differently-weighted parallel driver slices in response to said indication to reduce said power consumption, wherein the driver slices have a common output node that connects the digital interface transmitter via at least one interface signal line conductor to a remote receiver for conducting a digital signal to the remote receiver.

2. The method of claim 1, wherein said disabling programs individual drive currents of each slice at each stage of said slice as a weight of different values to provide a range of selectable drive levels exceeding N:1, where N is the number of said driver slices.

3. The method of claim 2, wherein said disabling programs said individual drive currents at each slice at each stage as a weight of powers of two, whereby a binary selection of transmitter current is provided.

4. The method of claim 2, wherein said disabling programs said individual drive currents at each slice at each stage by a weight of arbitrary factors, whereby a selection of transmitter current is provided in accordance with a discrete set of transmitter power requirements.

5. The method of claim 1, further comprising:
   measuring a quality of an interface signal conducted by the at least one interface signal line conductor;
   determining whether or not said quality is above a threshold level; and
   in response to determining that said quality is above a threshold level, generating said indication.

6. The method of claim 5, wherein said measuring and determining are performed at the remote receiver, and wherein said method further comprises communicating a state of said indication to another receiver local to the digital interface transmitter, whereby said state of said indication is used to perform said disabling at said local side of said interface.

7. A method of controlling power consumption in a digital interface transmitter, comprising:
   measuring a quality of an interface signal conducted by one or more interface signal line conductors connected to at least one output of the digital interface transmitter;
   determining whether or not said quality is above a threshold level; and
   in response to determining that said quality is above a threshold level, disabling one or more differently-weighted parallel driver slices of the digital interface receiver to reduce said power consumption, wherein said disabling programs individual drive currents of each slice at each stage of said slice as a weight of different values to provide a range of selectable drive levels exceeding N:1, where N is the number of said driver slices, and wherein the driver slices have a common output node that connects the digital interface transmitter via at least one interface signal line conductor to a remote receiver for conducting a digital signal to the remote receiver.

8. The method of claim 7, wherein said measuring and determining are performed at the remote receiver, and wherein said method further comprises communicating a state of said indication to another receiver local to the digital interface transmitter, at a local side of said interface signal lines whereby said state of said indication is used to perform said disabling at said local side of said interface.

9. The method of claim 7, wherein said disabling programs said individual drive currents at each slice at each stage as a weight of powers of two, whereby a binary selection of transmitter current is provided.

10. The method of claim 7, wherein said disabling programs individual drive currents at each slice at each stage by a weight of arbitrary factors, whereby a selection of transmitter current is provided in accordance with a discrete set of transmitter power requirements.

11. A method of controlling power consumption in a digital interface transmitter, comprising:
   measuring a quality of an interface signal conducted by at least one interface signal line conductor connected to at least one output of the digital interface transmitter, wherein the measuring is performed at a remote receiver connected to an opposite end the at least one interface signal line conductor;

determining whether or not said quality is above a threshold level; and in response to determining that said quality is above a threshold level, disabling one or more differently-weighted parallel driver slices of the digital interface receiver to reduce said power consumption, wherein said disabling programs individual drive currents at each slice at each stage by a weight of arbitrary factors, whereby a selection of transmitter current is provided in accordance with a discrete set of transmitter power requirements and wherein said individual drive currents of each slice at each stage provide a range of selectable drive levels exceeding N:1, where N is the number of said driver slices, and wherein the driver slices have a common output node that connects the digital interface transmitter via the at least one interface signal line conductor to a remote receiver for conducting a digital signal to the remote receiver.

* * * * *